Aug. 18, 1942.    F. A. DOLL ET AL    2,293,535
MULTIPLE SPOT WELDER
Filed March 19, 1941    10 Sheets-Sheet 1
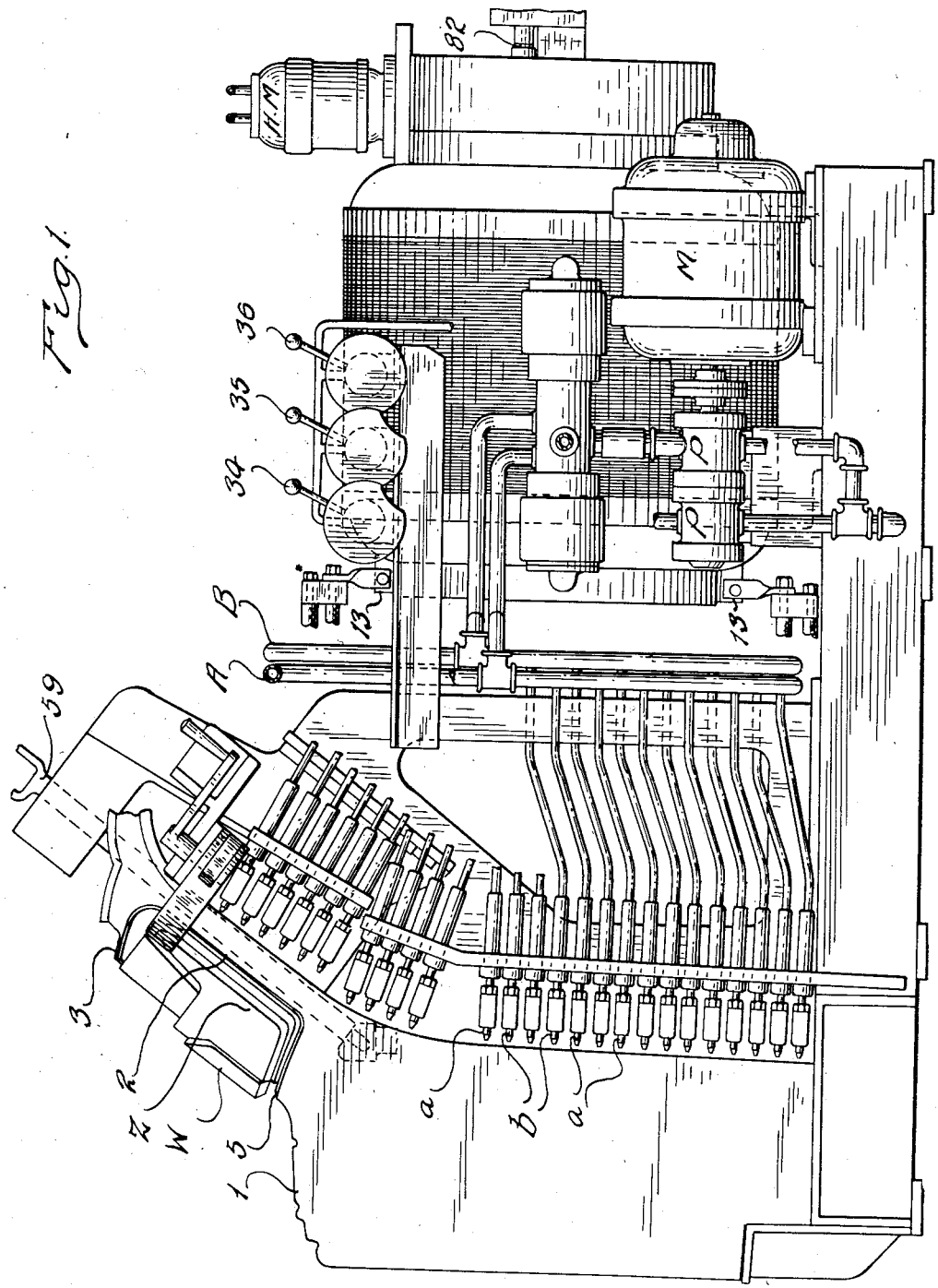
INVENTORS.
FRANK A. DOLL.
BY  CHARLES KURZ.
Barnes, Kisselle, Laughlin & Raisch
ATTORNEYS

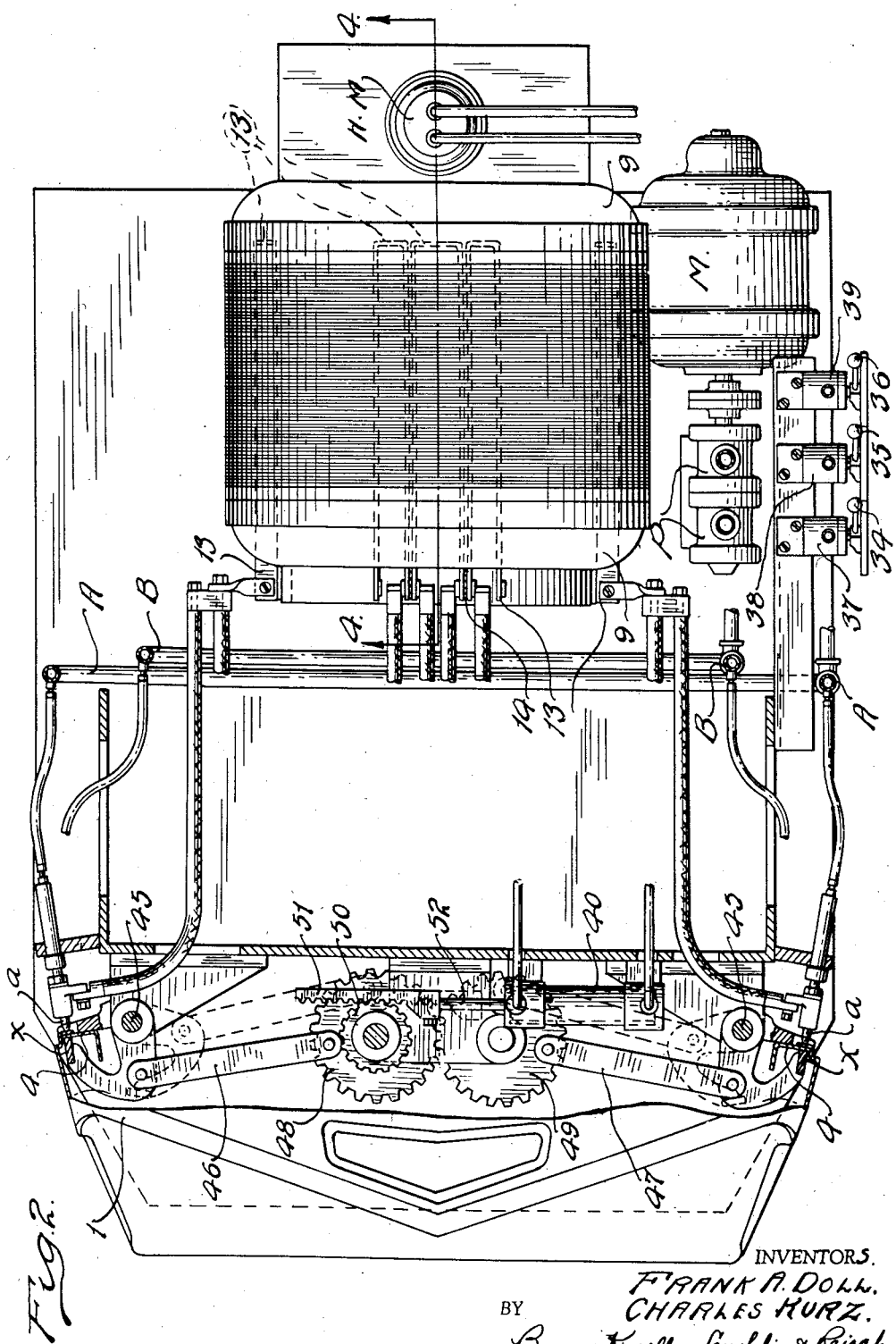

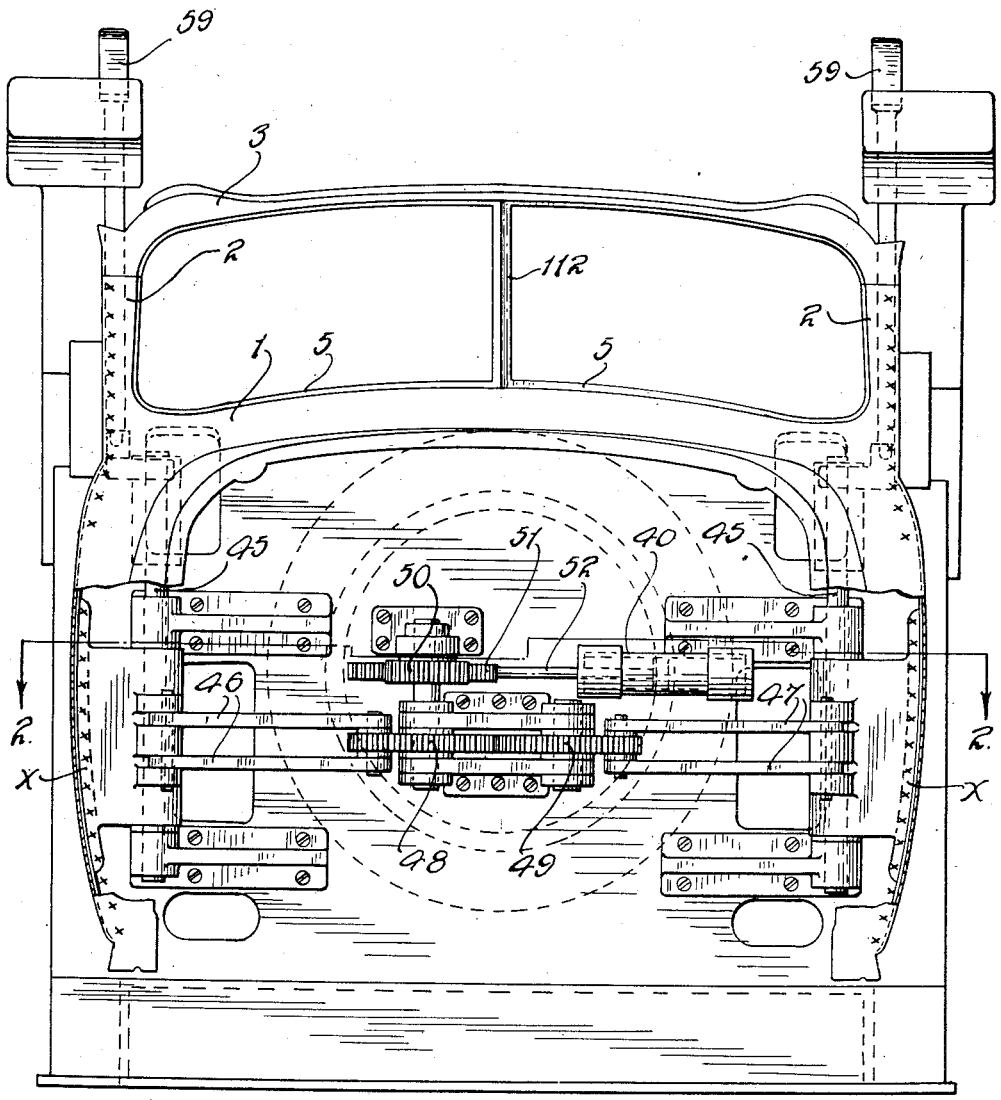

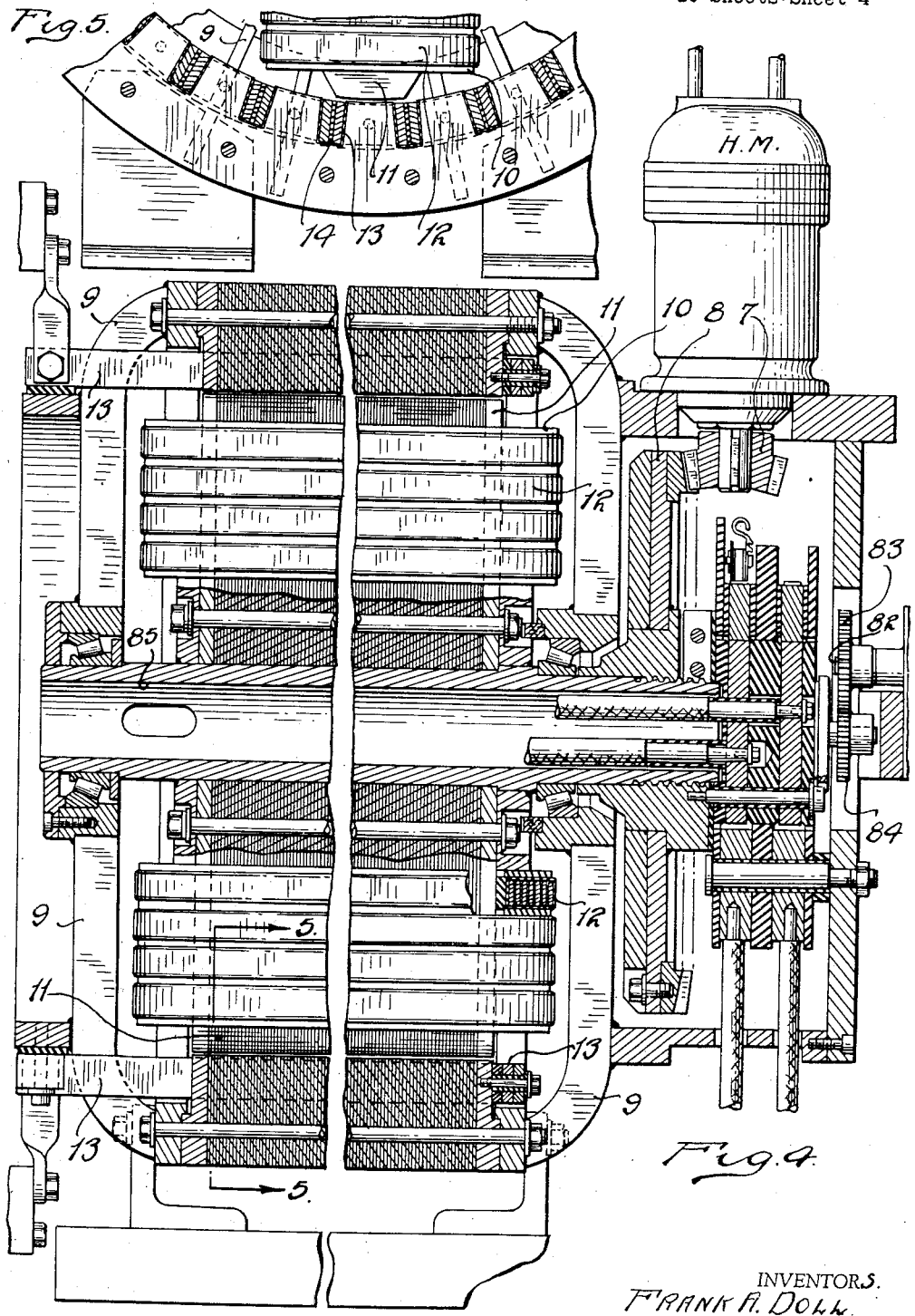

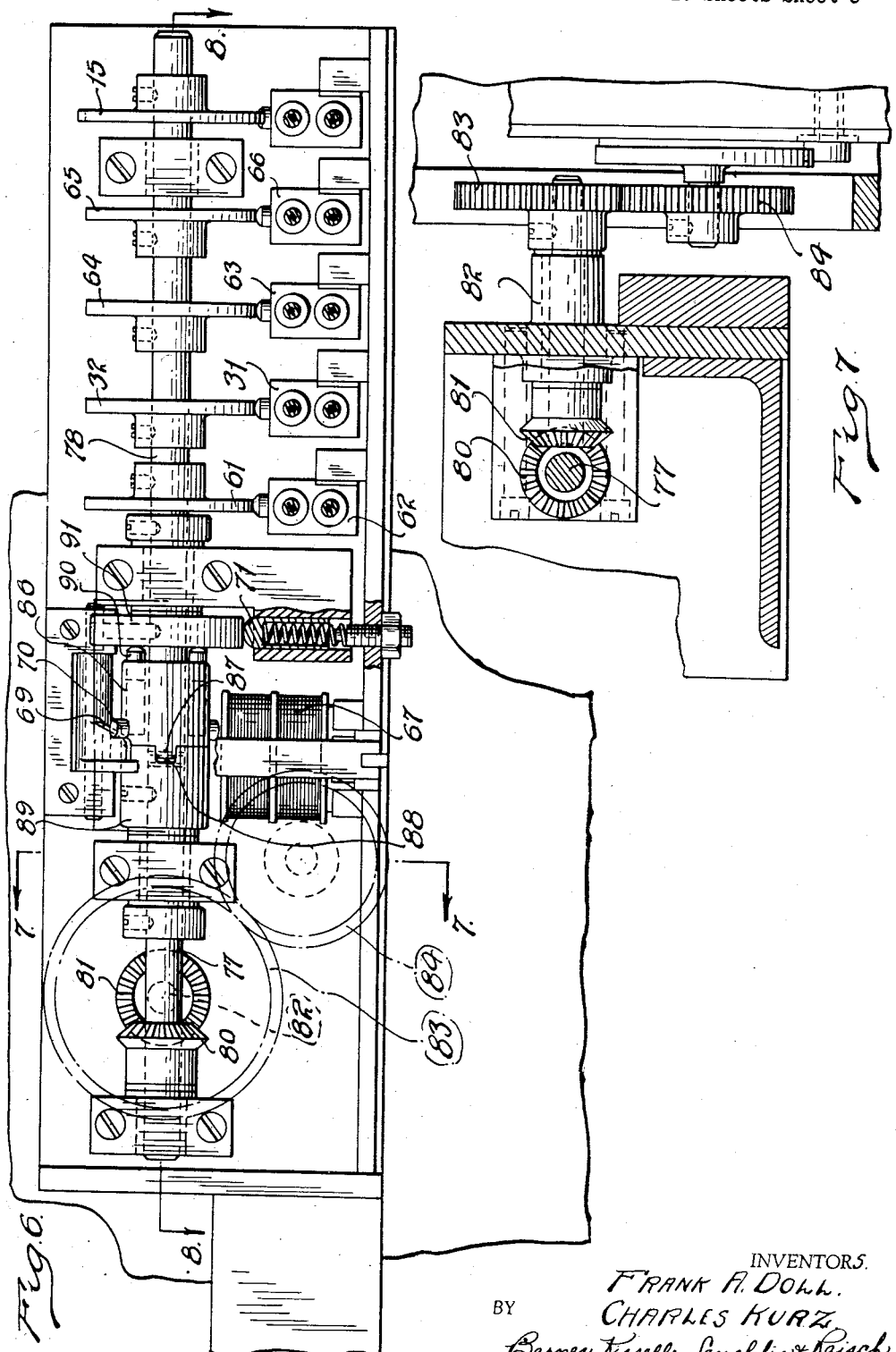

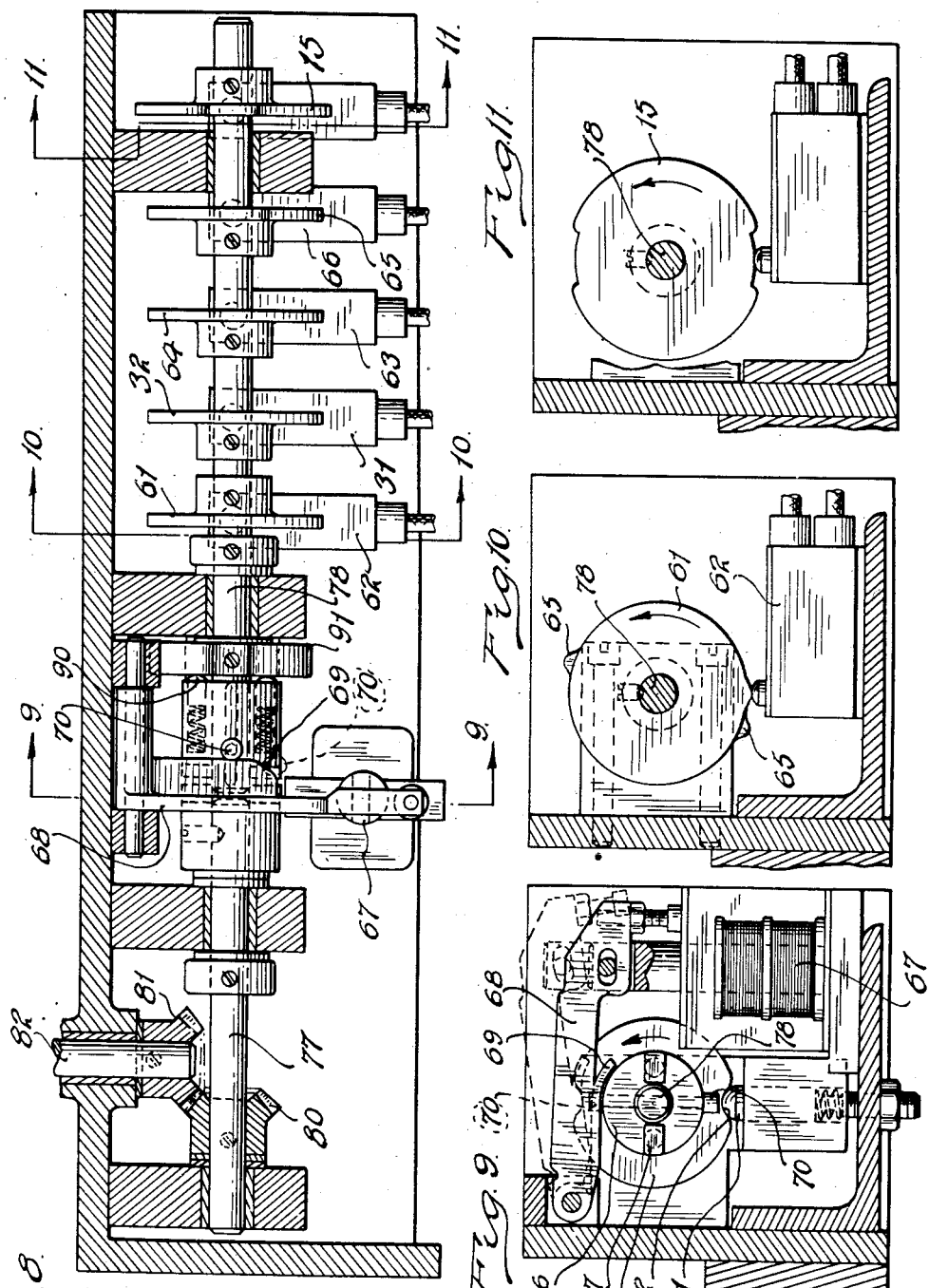

Aug. 18, 1942.　　F. A. DOLL ET AL　　2,293,535
MULTIPLE SPOT WELDER
Filed March 19, 1941　　10 Sheets-Sheet 7
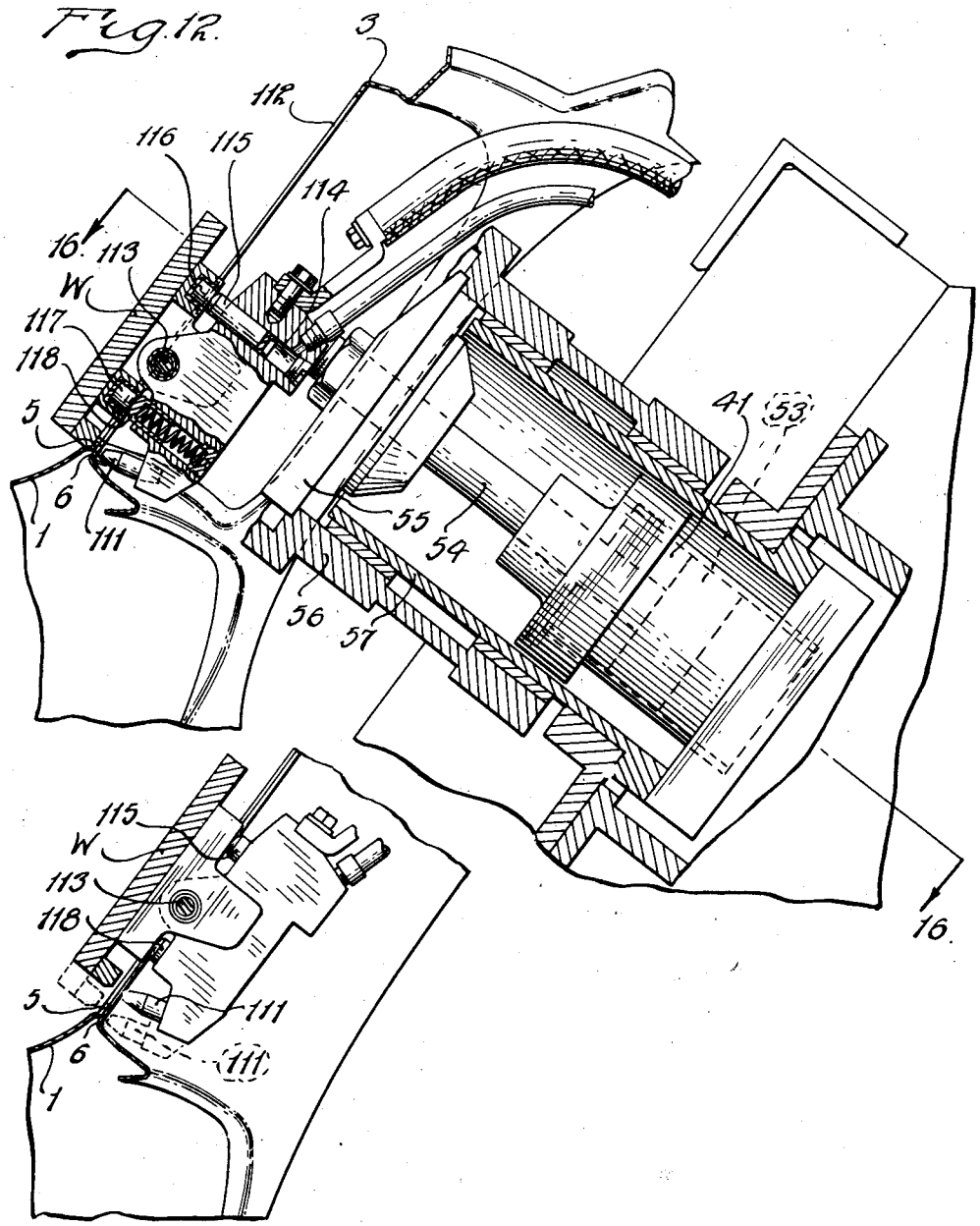
INVENTORS.
FRANK A. DOLL.
BY CHARLES KURZ.
Barnes, Kisselle, Laughlin & Raisch
ATTORNEYS.

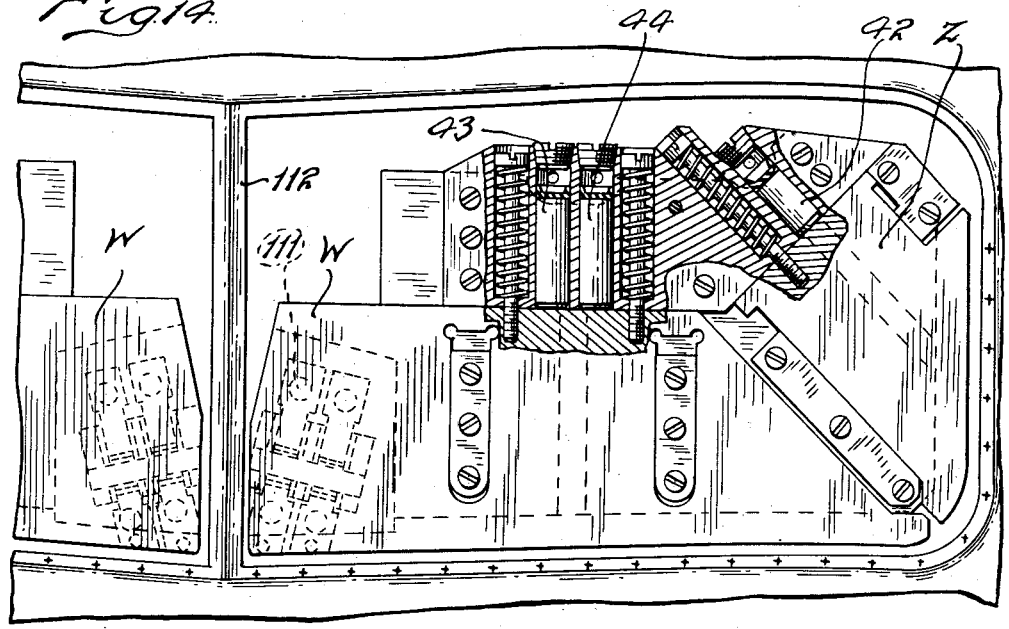
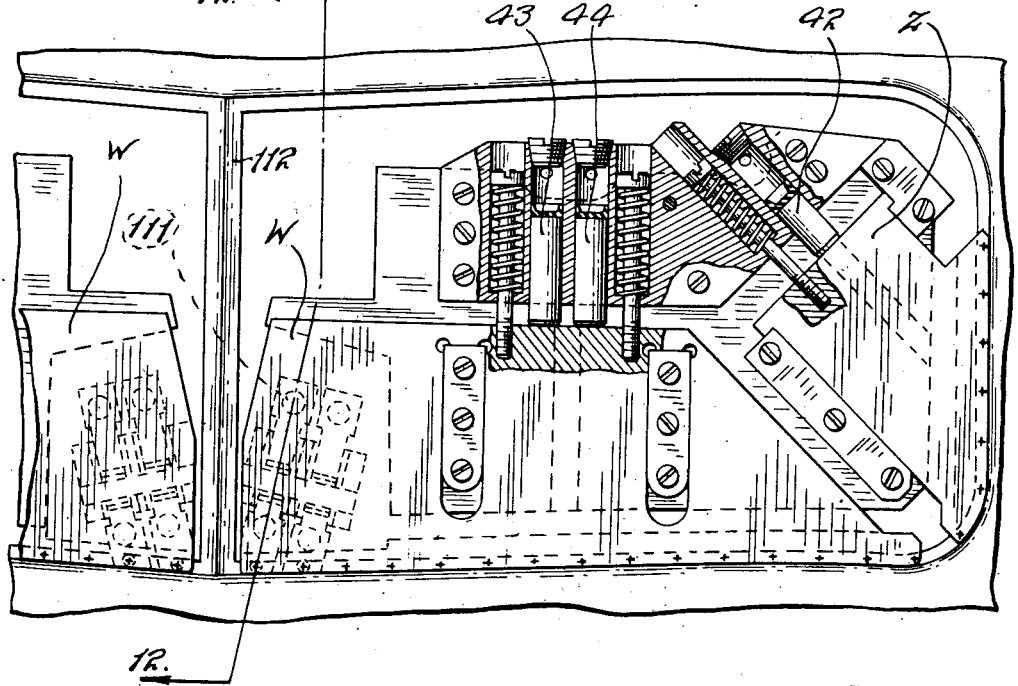

Aug. 18, 1942.  F. A. DOLL ET AL  2,293,535
MULTIPLE SPOT WELDER
Filed March 19, 1941  10 Sheets-Sheet 9
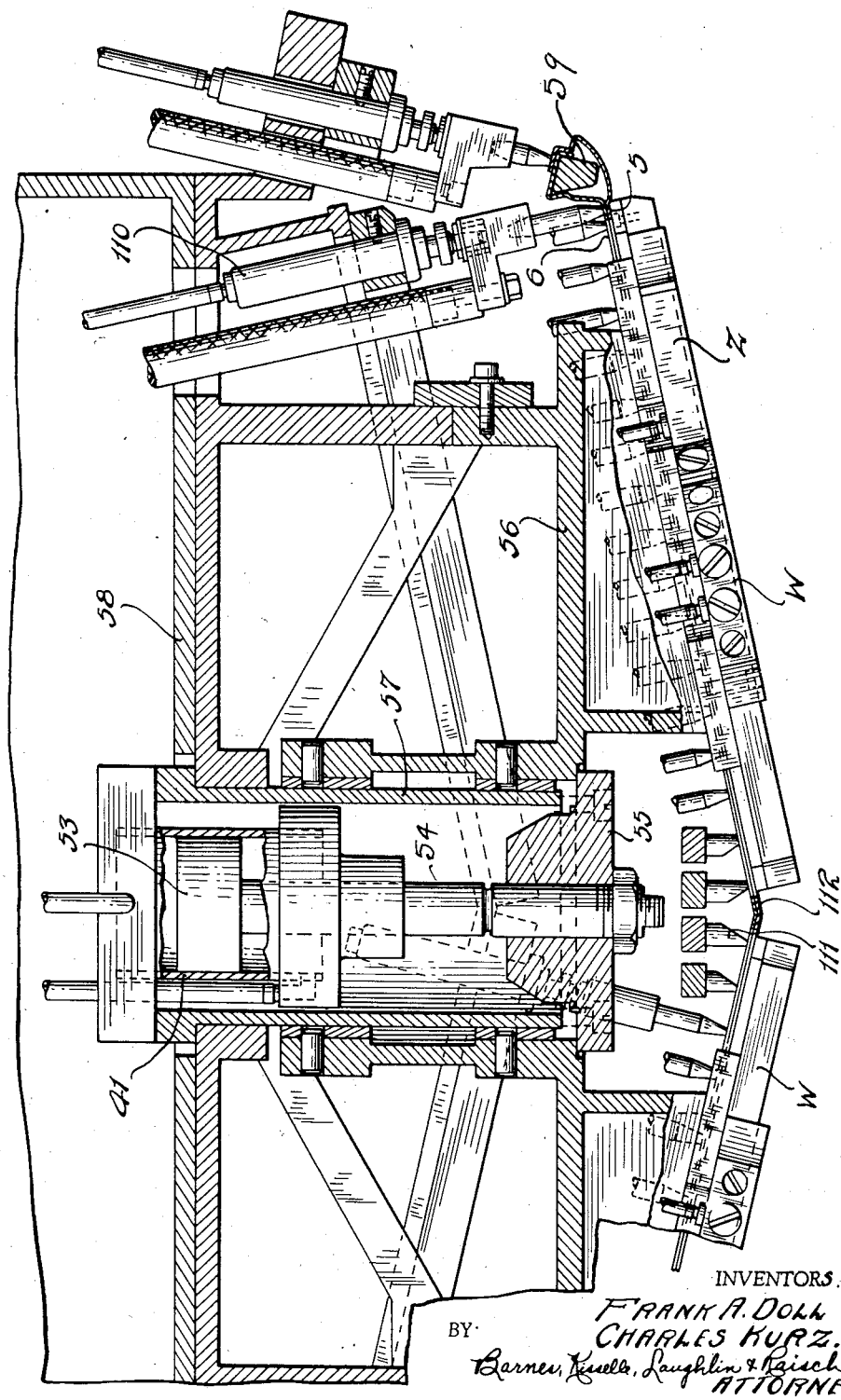
INVENTORS.
FRANK A. DOLL
CHARLES KURZ.
BY Barnes, Kissell, Laughlin & Raisch
ATTORNEYS.

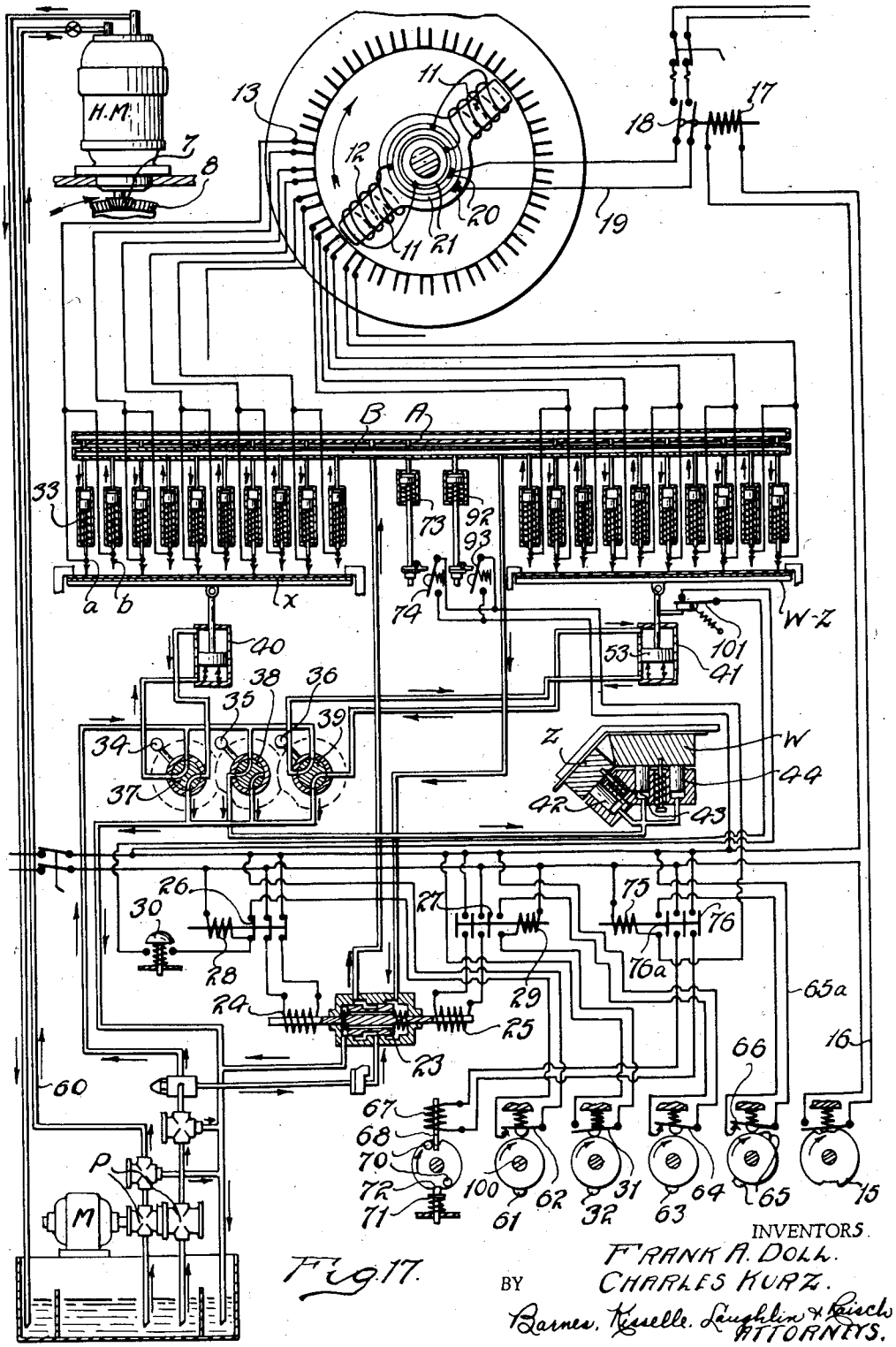

Patented Aug. 18, 1942

2,293,535

UNITED STATES PATENT OFFICE 2,293,535

MULTIPLE SPOT WELDER

Frank A. Doll and Charles Kurz, Detroit, Mich., assignors to General Motors Corporation, Detroit, Mich., a corporation of Delaware Application March 19, 1941, Serial No. 384,030

21 Claims. (Cl. 219—4)

This invention relates to a multiple spot welder for use in welding metal assemblies, particularly the front end assemblies of automobile bodies. It is the object of the invention to provide a new welding fixture in which the current is distributed without arcing to a large number of electrodes which are fluid operated to bring them into simultaneous engagement with the work and remove them from the work. This is done automatically and in proper succession.

Referring to the drawings:

Fig. 1 is a side elevation of the machine.

Fig. 2 is a plan view of the same with some of the parts omitted for clearness of disclosure.

Fig. 3 is a front elevation of the front body assembly showing, in detail, the lower backup electrodes and work clamps.

Fig. 4 is a cross section through the transformer-distributor taken on the line 4—4 of Fig. 2.

Fig. 5 is a section taken on the line 5—5 of Fig. 4.

Fig. 6 is an elevation showing the cams and timing apparatus.

Fig. 7 is a section on the line 7—7 of Fig. 6.

Fig. 8 is a plan sectional view of the timing apparatus taken on the line 8—8 of Fig. 6.

Figs. 9, 10 and 11 are sections on the corresponding section lines of Fig. 8.

Fig. 12 is a section on the line 12—12 of Fig. 15, showing one of the rocking welding electrodes in inoperative position adjacent the pinch weld flange. There are four of these special electrodes used adjacent the windshield division pillar (see Figs. 14 and 15).

Fig. 13 is a detail showing, in full lines, these electrodes retracted and, in dotted lines, the same electrodes expanded in position to grip the pinch weld flange.

Figs. 14 and 15 are elevational views, partly in section, through the windshield opening showing, in Fig. 14, the electrode sets retracted to be withdrawn from the pinch weld flange and, in Fig. 15, expanded to straddle the pinch weld flange.

Fig. 16 is a section taken on the line 16—16 of Fig. 12.

Fig. 17 is a diagrammatical view of the apparatus.

This particular apparatus is intended to weld a large part of the front assembly of an automobile body. The front assembly includes the cowl stamping 1 (Figs. 1–3). This stamping includes about two-thirds of the windshield pillar covers 2. The purpose of the machine is to clamp together this cowl stamping with the inner windshield frame 3. This frame comprises the inner frame of the windshield and the lower pillar portions 4 of the body (Fig. 2). There is an approximately vertical line of welds between the outer shell and the inner frame, as appears by the weld marks (X) in Fig. 3. Where the windshield frame 3 meets the windshield opening flange of the cowl 1 (see Fig. 12), flanges 5 and 6 come together. These flanges are called pinch weld flanges because, heretofore, they have ordinarily been welded by a pinch weld tool that pinches the two flanges between the electrodes. It is the purpose of this machine to weld, in a few seconds after the work has been set in the fixture, both windshield pillars and the pinch weld flanges of the cowl stamping and the inner windshield frame. This welding is done by bringing only selected portions of the electrodes upon the work at one time and connecting and using a transformer type distributor of the type shown and described in the application of Francis G. Da Roza and Robert Schiff, Serial No. 271,628, filed May 4, 1939. The transformer type of distributor described and claimed in the Da Roza and Schiff application has a plurality of secondary circuits located around a rotating armature which carries the primary coils. As the primary rotates through half a turn, it successively induces current in the secondary circuits. This affords an arcless distributor of these large amperage currents to a large number of electrodes that are all in contact with the work at one time. The capacity of a machine of this kind is, however, limited as only a given number of secondaries can be arranged around a distributor of a given size.

One of the objects of the present invention is to enlarge the capacity of this type of machine or any distributor of the secondary current by connecting two or more electrodes to one secondary or distributor segment but bringing these electrodes upon the work successively. Let us say that we have connected with each secondary or segment the electrodes a, b and c. The fluid control for the electrodes brings all the electrodes a in contact with the work at one time. The distributor primary is energized for half a revolution and, inasmuch as the armature has two poles, it energizes all the secondaries around the 360° in one-half a revolution. Thereby, all the electrodes a have been given successive shots of current. The electrodes are then withdrawn and the electrodes b are all brought simultaneously in contact with the work and the distributor armature is energized for another half rotation and all the electrodes b are successively energized.

They are then withdrawn and the electrodes c are caused to simultaneously contact with the work. The armature is again energized for another half turn and successively energizes all these electrodes c. In this particular machine, the electrodes are divided only into two groups a and b as the number of welds required can be secured with the two-group arrangement. It is obvious that any small number of groups can be used, depending upon the number of welds required and the number of separate secondaries or segments that can be built around the periphery of the distributor.

Referring to Figs. 4 and 5: The distributor will be seen. The distributor is driven by a hydraulic motor H. M. which rotates the pinion 7 that meshes with the large mitre gear 8 on the top of the distributor casing 9. The armature is designated 10. This has two poles 11. Around these poles are wrapped the primary coils 12. The secondaries are in the form of U-loops 13 (note one half of the U in Fig. 4), located around the inner perimeter of the stator of the distributor. In Fig. 5, one sees the two legs of the U, spaced one from the other. The two legs that are together and separated by insulation 14 are the legs of adjacent U's. As the pole 11 of the armature or primary passes a U, a full strength current is induced in that short, heavy secondary with a very large step-up of the amperage and decrease of the voltage.

The rotor of the transformer is rotating continuously but the primary current is only on for half a revolution. This is achieved by the cam 15 (diagrammatic view, Fig. 17), which closes the control circuit 16, operating solenoid 17, closing switch 18, which closes primary circuit 19 that has brushes 20 which wipe the commutator rings 21 and furnish current to the primary coils 12 of the two poles 11 on the distributor. This timer is calculated to close the primary circuit of the rotor only through half a revolution.

It will be noticed that each secondary or segment 13 has two electrodes a and b connected with it (see Fig. 17). There might be three electrodes or any reasonable number. When the electrodes a are in contact with the work, the electrodes b are out of contact with the work. These electrodes are furnished with fluid pressure by different manifolds, to-wit: manifolds A and B. The flow of the fluid to the manifolds is controlled by the slide valve 23 which is shifted back and forth by the solenoids 24 and 25 which, in turn, are controlled by the electric switches 26 and 27 that are, in turn, controlled by solenoids 28 and 29. Solenoid 28 is controlled by the starter push button 30 and solenoid 29 is controlled by switch 31 which, in turn, is controlled by the cam 32 on the cam shaft 100. Hence, the pressing of starter button 30 closes switch 26 and solenoid 24, pulls valve 23 to the left, and thereby turns pressure into manifold A and relieves it from manifold B. This applies the electrodes a to the work. The cam 15 then throws the current through the primary circuit of the distributor through one-half a turn and, consequently, all the electrodes a are successively energized. Thereupon, in timed relation with the timing cam 15, cam 32 closes switch 31, energizes solenoid relay 29 and solenoid 25 and pulls the fluid valve 23 to the right and reverses the fluid, exhausting the fluid from manifold A and turning it into manifold B. The springs 33 return the electrodes a to their retracted position and the pressure in pipe B brings the electrodes b into contact with the work.

Each of the groups of electrodes is provided with the same backup electrodes which carry the current in series through two adjacent electrodes a or b which are hooked up to the same secondary. Referring to the diagram: One backup electrode is designated X, another W, and a third Z. These electrodes will be more fully described in connection with the position they take on the work later. They are brought into contact with the work by means of turning the hand levers 34, 35 and 36 (Fig. 1) which control valves 37, 38 and 39. These control fluid lines leading to cylinders 40, 41, 42, 43 and 44. Looking at Figs. 14 and 15: It will be seen that the backup electrodes W and Z back up the bottom run and the side run of the pinch weld flange.

Referring to Figs. 2 and 3: Cylinder 40 operates the backup electrodes X, X which are swinging windshield pillar leg clamps swinging on the pivots 45 and connected by links 46 and 47 (Fig. 2) with the gears 48 and 49. The gears are driven by a pinion 50 operated by rack 51 on the end of piston rod 52.

The backup electrodes W and Z, that is, the backup electrodes of the pinch weld flange not only have to be expanded (as shown by comparing Figs. 14 and 15 and particularly by comparing the full line showing in Fig. 13 and the dotted line showing) but the backup electrode has to be pulled down upon the work. This is done by the piston 53 in cylinder 41 (see Figs. 12 and 16). Piston rod 54 connects with a head 55 which bears against the support 56. This support is movable back and forth on the cylinder 57 (Fig. 16) which, in turn, is supported on the frame 58 of the machine. In Fig. 16, the support which carries the backup plates W and Z is shown pulled down, that is, pulled towards the back of the car to bring the backup plates W and Z against the outside face of the pinch weld flanges 5 and 6.

When the inner windshield frame 3 and the outer cowl and windshield pillar cover stamping 1 have been set on the fixture, the first operation is to operate the lever 34. This, through cylinder 40, swings the two windshield pillar leg clamps or backup electrodes X against the inside of the windshield pillar legs 4 (as shown in Fig. 2). This is done by means of the rack and pinion arrangement shown in that figure and described above. Then, lever 35 is swung and this operates the cylinders 42 and 44 (shown in Figs. 14 and 15) to expand the backup electrodes W and Z (as shown by comparing Figs. 14 and 15) and particularly the full line and dotted line showing in Fig. 13. This causes the backup electrode and the individual electrodes to straddle the pinch weld (as shown in Fig. 13, in the dotted line showing). Now, it is necessary to pull the backup electrodes W and Z tightly against the work and this is done when lever 36 is swung to operate valve 39, sending oil into cylinder 41 and operating piston 53 (as shown in Figs. 12 and 16).

The backup electrodes for the upper portion of the windshield pillars are designated 59 and are simply copper bars that are forced into the top opening of the windshield pillar. This is done by hand.

We are now ready for welding. The starter button 30 is pushed. This, as already explained, moves valve 23 to the left and sends oil into manifold A. 101 is a switch operated by the pull-down piston 53 and insures that the electrodes cannot be brought against the work until electrode bars X and Z have been pulled down against the work. This pressure in manifold A throws half the electrodes, to-wit: the electrodes a, into contact with the work, there being two electrodes for each secondary or segment in the distributor. The switch 74 is momentarily tripped which energizes solenoid 75, closes switch 76, energizing solenoid 67 and coupling the cam shaft with the driving shaft as later explained. The distributor is being rotated at a moderate speed by means of the hydraulic motor which is furnished with oil through pipe 60 (Fig. 17). The pump P is operated by the electric motor M. The rotor of the transformer-distributor is being continuously rotated while the machine is in operation. The cam shaft is driven at substantially the same speed as the rotor. The cam 15 (the timer cam) keeps the primary switch 17 closed for half a revolution of the rotor of the distributor. Thereupon, cam 32 closes switch 31, which energizes relay 29 which energizes solenoid 25 and shifts the fluid valve to the right and applies fluid pressure to the other group of electrodes b and releases the pressure on the other electrodes a. Then, again, another segment of the cam 15 closes circuit 16 and again energizes the primary for half a cycle of the rotor. At the same time that cam 32 closes the circuit that controls solenoid 25, cam 61 releases switch 62 in the circuit that controls solenoid 24 that has previously shifted the valve 23 to the left. Similarly, the cam 63 releases switch 64 each time to break the current through relay 29, if current is flowing through solenoid 25, and thus releases the solenoid 25 so that valve 23 can be shifted to the left to bring the electrodes a in contact with the work when a second piece of work is put onto the machine. Pin 71 engages in notch 72 and prevents the cam shaft overthrowing when disconnected from the drive shaft.

The details of the usual one-revolution throw-out clutch are shown in Figs. 8 and 9. 77 is the drive shaft. 78 is a driven shaft. These two are connected by the one-revolution clutch. This has the cam 69 on the arm 68. This cam contacts with the pin 70. This pin 70 is attached to collar 86 (Fig. 6) which has a key 87 that engages in slot 88 of the driving collar 89. The driven collar 86 is pressed into engagement with the driving collar by means of the spring-pressed pins 90 engaging with the collar 91 on the driven shaft. The drive shaft is driven through mitre gears 80 and 81. The gear 81 is on shaft 82 on which is located driven gear 83 which is driven by gear 84. Turning to Fig. 4: It will be seen that the driving gear 84 is on the end of the rotor shaft 85 of the transformer-distributor so that the two are synchronously driven. It is desirable to have the cam shaft driven at a slightly greater speed than the generator shaft so the gear 84 is slightly smaller than gear 83.

When the pressure is turned into manifold A by slide valve 23 being pulled to the left on depressing starter button 30, pressure in the cylinder 73 momentarily closes switch 74. This energizes solenoid 75 and closes switch 76. This energizes solenoid 67, retracts the clutch throw-out lever 68, releases the clutch pin 70 and allows key 87 to drop into key slot 88 as the drive shaft rotates. This couples the timer shaft with the drive shaft. The switch bar 76a closes a holding circuit so that the switch is held closed although the switch 74 is only momentarily closed. Then, at the proper time, one of the cams 65 opens circuit 65a and again drops the clutch throw-out lever down into the path of the pin 70. When a half revolution of the timer shaft has taken place, the slide valve 23, as already explained, has been pulled to the right, the pressure is then exhausted from manifold A and turned into manifold B. Thereupon, the pressure in the cylinder 92 closes switch 93 momentarily and the same circuit through the solenoid 75 is momentarily closed, then held closed by the holding circuit through the switch bar 76a and again is broken at switch 66 by one of the two cams 65 so as to drop the clutch throw-out lever 68 into the path of the clutch pin 70 to stop the rotation of the timer shaft by releasing the coupling at the end of one revolution.

Referring to Fig. 16: It will be seen that each electrode has an individual fluid cylinder for pressing the electrode upon the work. These are long cylindrical electrodes, as shown in this figure, with the exception of the four electrodes designated 111. These are located two on each side of the division pillar 112 of the windshield. The disposition of the cylindrical electrodes is such here that there is not room for the usual type of cylindrical electrodes at this point. Hence, special electrodes of the rocker type have to be used. These four electrodes are shown in Figs. 14 and 15 and details are shown in Figs. 12 and 13. Here, the electrode support is pivoted at 113 (Fig. 12). Fluid enters the chamber 114 and drives plunger 115 outwardly until it strikes the insulated socket 116 in the backup electrode W. This pushes the tip of the electrode into contact with the pinch weld flange 6. The spring-pressed pin 118 enters the insulated slot 117 in the backup electrode W and, when the fluid pressure is released in the chamber 114, this spring-pressed pin swings the electrode 111 to open position.

This machine is designed to weld the front assembly of a metal automobile body together but, obviously, it could do other work and this is simply an example of the work that it can do. So, we do not want to be limited to a front assembly welding machine. The main idea is to provide separate groups of electrodes, the electrodes of one group being brought into contact with the work at one time and the other groups brought into contact with the work at succeeding times. A distributor of the secondary current is used. This distributor has a limited capacity so that it can distribute the current successively to the electrodes of only one group in one operation of the distributor. Thereupon, the first group of electrodes is discontinued from operative connection with the distributor by withdrawing them from the work and a second group of electrodes is brought into operative relation with the distributor by being brought into contact with the work. Thereupon, a second operation of the distributor is had. It would even be possible to have more groups of electrodes and more operations of the distributor. Each secondary lead from the distributor is connected with one or more electrodes of each group. But each secondary from the distributor is only active with respect to the electrode or electrodes of the group which is at the time in contact with the work. This arrangement is designed primarily for operation with a rotating primary type of transformer-distributor because that distributor would otherwise have a rather limited capacity by reason of the number of individual secondary circuits that can be located around its inner perimeter. But it obviously has a wider use and could be used with other types of distributors for secondary circuits.

The machine is also designed to, when started, automatically bring one set of electrodes into contact with the work, time the operation of the distributor and, after one operation of the distributor, automatically retract the first group of electrodes from the work, then automatically bring a second group of electrodes into contact with the work and start and time the operation of the distributor and then retract the second group of electrodes from the work, etc. The work is clamped in proper position by the electrodes and suitable power operation is afforded to do this clamping operation and particularly to expand the electrode supports to straddle the flanges that are to be welded and then, by another power operation, to pull the backup electrodes down onto the flanges. Thereupon, groups of electrodes are brought into contact with the work successively and automatically, as just explained. The shift from one group of electrodes to another is very rapid and the successive spot welds in each welding operation is extremely rapid.

Inasmuch as there are two welding points connected in series with each U secondary and, inasmuch as there are two poles on the rotor which rotates only half a cycle in performing all the welding with one group of electrodes, there are four welds made simultaneously. The succession from one set of four welds to the next is almost instantaneous. By reason of using the rotating primary type of transformer-distributor, there is no arcing or sparking of any kind and nearly perfect welds are obtained by a substantially uniform distribution of the current. There is little or no noise in the operation of the machine because the electrodes are brought gently into contact with the work and thereby the life of each electrode is very much prolonged.

We claim:

1. In a machine for welding assemblies requiring a large number of spot welds, the combination of a multiplicity of welding electrodes arranged in large groups, all the individual electrodes of one group arranged to follow the electrodes of another group into simultaneous contact with and retraction from the work, a current distributor for successively distributing current to electrodes of one group of electrodes in contact with the work and conductors between the distributor and the individual electrodes whereby each secondary lead from the distributor is connected to one or more electrodes of each group so that the distributor distributes secondary current to electrodes in succession in each group during one operation of the distributor and then repeats the distribution with respect to a second group of electrodes upon a second operation of the distributor.

2. The combination claimed in claim 1 in which the distributor is a transformer type and in which the rotor of the distributor is a rotating primary and the secondary leads are parts of the secondary circuits in which current is successively induced by the rotation of the rotor carrying part of the primary circuit.

3. In a machine for welding assemblies requiring a large number of spot welds, a distributor having a plurality of secondary leads and a rotor for distributing current successively to said leads and a plurality of welding electrodes, several electrodes connected to each secondary lead and means for bringing separate groups of electrodes successively onto the work and successively retracting the same from the work, each group of electrodes simultaneously contacting the work and including only part of the electrodes connected with each secondary lead.

4. In a machine for welding assemblies requiring a large number of spot welds, a distributor having a plurality of secondary leads and a rotor for distributing current successively to said leads and a plurality of welding electrodes, several electrodes connected to each secondary lead and means for bringing separate groups of electrodes successively onto the work and retracting the same from the work, each group of electrodes simultaneously contacting the work and including only part of the electrodes connected with each secondary lead, the distributor comprising a stator in which the secondary leads are each part of a secondary circuit and arranged in insulated relation around the inner perimeter of the stator and in which the rotor includes part of a primary circuit for successively inducing shots of energy in the secondaries as the rotor rotates past the stator.

5. In a machine for welding assemblies requiring a large number of spot welds, a distributor having a plurality of secondary leads and a rotor for distributing current successively to said leads, a plurality of welding electrodes, several electrodes connected to each secondary lead, means for bringing separate groups of electrodes successively onto the work and successively retracting the same from the work, each group of electrodes simultaneously contacting the work and including only part of the electrodes connected with each secondary lead, the distributor comprising a stator in which the secondary leads are each part of a secondary circuit and arranged in insulated relation around the inner perimeter of the stator and in which the rotor includes part of a primary circuit for successively inducing shots of energy in the secondaries as the rotor rotates and a timing shaft which can be detachably coupled to the rotating distributor for restricting the delivery of primary current to the rotor during a given rotation of the rotor to cause the distributor to become operative.

6. In a machine for welding assemblies requiring a large number of spot welds, a distributor having a plurality of secondary leads and a rotor for distributing current successively to said leads, a plurality of welding electrodes, several electrodes connected to each secondary lead, means for bringing separate groups of electrodes successively onto the work and successively retracting the same from the work, each group of electrodes simultaneously contacting the work and including only part of the electrodes connected with each secondary lead, the distributor comprising a stator in which the secondary leads are each part of a secondary circuit and arranged in insulated relation around the inner perimeter of the stator and in which the rotor includes part of a primary circuit for successively inducing shots of energy in the secondaries as the rotor rotates, a timing shaft which can be detachably coupled to the rotating distributor for restricting the delivery of primary current to the rotor during a prescribed rotation of the rotor to cause the distributor to become operative, means for automatically and successively bringing the electrode groups into and out of contact with the work and cams on the timing shaft and devices for controlling such means in timed relation with the application of the current to the primary of the distributor.

7. In a machine for welding assemblies requiring a large number of spot welds, the combination of a multiplicity of welding electrodes arranged in groups, all the individual electrodes of one group arranged to follow the electrodes of another group into simultaneous contact with and retraction from the work, a current distributor with secondary leads for successively distributing current to sets of electrodes of one group of electrodes in contact with the work and conductors between the distributor and the individual electrodes arranged so that each secondary lead from the distributor is connected to one or more electrodes of each group so that the distributor distributes secondary current to electrodes in successive sets in each group during one operation of the distributor and then repeats the distribution with respect to a second group of electrodes upon a second operation of the distributor, the said distributor having a rotor and a timer shaft detachably coupled up with the rotor for permitting the flow of energy to the distributor in properly timed relation with the application of the groups of electrodes to the work.

8. In a machine for welding assemblies requiring a large number of spot welds, the combination of a multiplicity of welding electrodes arranged in large groups, all the individual electrodes of one group arranged to follow the electrodes of another group into simultaneous contact with and retraction from the work, a current distributor having secondary leads for successively distributing current to sets of electrodes of one group of electrodes in contact with the work and conductors between the distributor and the individual electrodes arranged so that each secondary lead from the distributor is connected to one or more electrodes of each group so that the distributor distributes secondary current to electrodes in successive sets in each group during one operation of the distributor and then repeats the distribution with respect to a second group of electrodes upon a second operation of the distributor, the distributor having a rotor and a timer shaft detachably coupled up with the rotor and arranged to permit the flow of electrical energy to the distributor in properly timed relation to the application of the groups of electrodes to the work, means for applying the groups of electrodes to and removing them from the work in proper order, the said timer shaft provided with cammed devices associated therewith for controlling such means in proper timed relation to the application of the current in the distributor.

9. The combination claimed in claim 8 in which the said last mentioned means for applying the electrodes and for withdrawing from the work comprises individual cylinders and fluid-operated pistons for the electrodes, manifolds for distributing fluid pressure to each group of electrodes, a valve for controlling the flow of fluid pressure to the manifolds, said valve being controlled by the said devices in association with the timer shaft.

10. In a machine for welding assemblies requiring a large number of spot welds, the combination of a multiplicity of welding electrodes arranged in groups, all the individual electrodes of one group arranged to follow the electrodes of another group into simultaneous contact with and retraction from the work, a current distributor having secondary leads therefrom for successively distributing current to sets of electrodes of one group of electrodes in contact with the work and conductors between the distributor and the individual electrodes arranged so that each secondary lead from the distributor is connected to one or more electrodes of each group so that the distributor distributes secondary current to electrodes in successive sets in each group during one operation of the distributor and then repeats the distribution with respect to a second group of electrodes upon a second operation of the distributor, the said distributor including a rotor, a timer shaft detachably coupled with the rotor for timing the electrical energy sent to the rotor and the distributor in accordance with the application of the electrode groups to the work, and a one-revolution clutch operating in connection with said timer shaft to disconnect the shaft from its coupling with the rotor after one revolution.

11. In a machine for welding assemblies requiring a large number of spot welds, the combination of a support, a plurality of welding electrodes carried on the support, fluid operated devices for bringing the electrodes against the work, back up electrodes carried by the support, means for expanding the support to straddle the work and means for pulling the back up electrodes down against one side of the work to pinch the work when fluid is turned into the fluid devices to bring the other electrodes against the work.

12. In a machine for welding assemblies requiring a large number of spot welds, the combination of a frame, a support movable on the frame, a plurality of electrodes carried on the support, an individual fluid cylinder and piston for controlling the application of each electrode to the work, backup electrodes also carried on the support and means for expanding the support with respect to the frame to bring the backup electrodes and the electrodes to straddle the work and means for pulling down the backup electrodes against the work.

13. The combination claimed in claim 12 wherein the means for expanding the electrode supports comprises fluid operated devices and in which means for pulling the backup electrodes down against the work comprises fluid operated devices.

14. In a machine for welding front assemblies for automobile bodies, the combination of a plurality of swinging backup electrodes, means for swinging the same in behind the legs of the windshield pillars, backup electrodes that can be placed in the upper portions of the electrode pillars, a multiplicity of electrodes that can be brought against the upper and lower portion of said windshield pillars in opposition to said backup electrodes, more backup electrodes and a multiplicity of electrodes supported together in the windshield openings and means for expanding the said electrodes and said last mentioned backup electrodes to straddle the pinch weld flange in the windshield opening and for drawing the electrodes together upon the work and means for distributing the current successively to sets of electrodes while the same are in contact with the work.

15. In a machine for welding front assemblies for automobile bodies, the combination of a plurality of swinging backup electrodes, means for swinging the same in behind the legs of the windshield pillars, backup electrodes that can be placed in the upper portions of the electrode pillars, a multiplicity of electrodes that can be brought against the upper and lower portion of said windshield pillars in opposition to said backup electrodes, more backup electrodes and a multiplicity of electrodes supported together in the windshield openings and means for expanding the said last mentioned electrodes and backup electrodes to straddle the pinch weld flange in the windshield opening and for drawing the electrodes together upon the work, means for bringing the electrodes into contact with the work in successive groups and means for distributing the current to the electrodes of one group in succession.

16. In a machine for welding front assemblies for automobile bodies, the combination of a plurality of swinging backup electrodes, means for swinging the same in behind the legs of the windshield pillars, backup electrodes that can be placed in the upper portions of the electrode pillars, a multiplicity of electrodes that can be brought against the upper and lower portion of said windshield pillars in opposition to said backup electrodes, more backup electrodes and a multiplicity of electrodes supported together in the windshield openings, means for expanding the said last mentioned electrodes and backup electrodes to straddle the pinch weld flange in the windshield opening and for drawing the electrodes together upon the work, means for bringing the electrodes into contact with the work in successive groups, a distributor having conductors leading therefrom connected with individual electrodes of separate groups and means for distributing the current successively to such conductors leading from the distributor.

17. In a welding machine for welding together the front assembly of an automobile body, which front assembly includes the windshield opening, the combination of a plurality of electrodes, a support therefor, backup electrodes carried by the support and means for expanding the support to cause the electrodes to straddle the pinch weld flange around the windshield opening, means for pulling the backup electrodes against the one side of the pinch weld flange and fluid operated means for bringing the individual electrodes against the other side of the flange.

18. In a welding machine for welding together the front assembly of an automobile body, which front assembly includes the windshield opening, the combination of a plurality of electrodes, a support therefor, backup electrodes carried by the support, means for expanding the support to cause the electrodes to straddle the pinch weld flange around the windshield opening, means for pulling the backup electrodes against the one side of the pinch weld flange, fluid operated means for bringing the electrodes against the other side of the flange in separate large groups but in succession and means for distributing current to said electrodes successively.

19. In a welding machine for welding together the front assembly of an automobile body, which front assembly includes the windshield opening, the combination of a plurality of electrodes arranged in groups, a support therefor, backup electrodes carried by the support, means for expanding the support to cause the electrodes to straddle the pinch weld flange around the windshield opening, means for pulling the backup electrodes against the one side of the pinch weld flange and means for distributing the current successively to the electrodes of one group, comprising a single distributor with which the electrodes of each group are connected but are in operative relation only when the electrodes are in contact with the work.

20. In a welding machine for front end assemblies for automobile bodies, the combination of a pair of backup electrodes arranged to be swung in behind the lower portion of the windshield pillar, fluid operated means for causing the same to be so swung, a plurality of individual electrodes and fluid operated means for causing the same to engage the lower portion of the windshield pillars in opposition to said backup electrodes and means for distributing the current to said electrodes in succession.

21. In a welding machine for front end assemblies for automobiles, the combination of a pair of backup electrodes arranged to be swung in behind the lower portion of the windshield pillar, fluid operated means for causing the same to be so swung, a plurality of individual electrodes and fluid operated means for causing said electrodes to contact the work in separate groups, the electrodes of both groups being connected to a single distributor and the said distributor arranged to distribute the current to the electrodes of each group in succession when that group is in contact with the work.

FRANK A. DOLL.
CHARLES KURZ.